(12) United States Patent
DiBenedetto (10) Patent No.: US 10,436,065 B2
(45) Date of Patent: Oct. 8, 2019

(54) RESILIENT BEARING MOUNT WITH INTEGRAL DAMPER FLUID PASSAGE FOR A GEARED TURBOFAN ENGINE

(71) Applicant: United Technologies Corporation, Farmington, CT (US)

(72) Inventor: Enzo DiBenedetto, Kensington, CT (US)

(73) Assignee: United Technologies Corporation, Farmington, CT (US)

( * ) Notice: Subject to any disclaimer, the term of this patent is extended or adjusted under 35 U.S.C. 154(b) by 708 days.

(21) Appl. No.: 15/240,248

(22) Filed: Aug. 18, 2016

(65) Prior Publication Data

US 2018/0051706 A1    Feb. 22, 2018

(51) Int. Cl.
*F16C 27/04* (2006.01)
*F16C 33/66* (2006.01)
(Continued)

(52) U.S. Cl.
CPC ......... *F01D 25/164* (2013.01); *F01D 25/162* (2013.01); *F01D 25/18* (2013.01); *F16C 27/045* (2013.01); *F16C 33/6637* (2013.01); *F16C 33/6659* (2013.01); *F02C 3/04* (2013.01); *F05D 2220/32* (2013.01); *F05D 2240/52* (2013.01); *F05D 2240/53* (2013.01); *F05D 2240/54* (2013.01); *F16C 2360/23* (2013.01)

(58) Field of Classification Search
CPC ...... F01D 25/162; F01D 25/164; F01D 25/18; F16C 27/00; F16C 27/045; F16C 33/6637
See application file for complete search history.

(56) References Cited

U.S. PATENT DOCUMENTS

| 4,440,456 A | * | 4/1984 | Klusman | F16C 27/045 384/581 |
| 4,460,283 A | * | 7/1984 | Yoshioka | F01D 25/164 384/119 |

(Continued)

FOREIGN PATENT DOCUMENTS

| EP | 0214481 A1 | 3/1987 |
| JP | H1162953 A | 3/1999 |

OTHER PUBLICATIONS

Extended European Search Report for EP Application No. 17185121.5, dated Jan. 22, 2018, 5 pages.

*Primary Examiner* — Igor Kershteyn
*Assistant Examiner* — Topaz L. Elliott
(74) *Attorney, Agent, or Firm* — Kinney & Lange, P.A.

(57) ABSTRACT

A gas turbine engine includes a bearing support ring with a first annular body and a second annular body disposed radially inward of the first annular body. A radial spring is connected to the first annular body and the second annular body. The gas turbine engine includes a frame with a case that extends around the first annular body. The frame includes an annular member connected to the case and positioned radially between the radial spring and the second annular body. A fluid port extends radially through the annular member. A seal is disposed around the annular member and forward of the fluid port. A first fluid passage extends through the case. A second fluid passage is formed between the bearing support ring and the frame and extends from the first fluid passage to the fluid port. A bearing outer race is disposed inward of the second annular body.

20 Claims, 5 Drawing Sheets

(51) Int. Cl.
*F01D 25/16* (2006.01)
*F01D 25/18* (2006.01)
*F02C 3/04* (2006.01)

(56) References Cited

U.S. PATENT DOCUMENTS

| | | | |
|---|---|---|---|
| 4,693,616 A * | 9/1987 | Rohra | F01D 25/164 |
| | | | 384/99 |
| 8,439,637 B2 | 5/2013 | DiBenedetto | |
| 2016/0040554 A1 | 2/2016 | Hovhannisian et al. | |

* cited by examiner

RESILIENT BEARING MOUNT WITH INTEGRAL DAMPER FLUID PASSAGE FOR A GEARED TURBOFAN ENGINE

BACKGROUND

The present disclosure relates to a gas turbine engine and, more particularly, to a thrust bearing system for a high pressure compressor section of the gas turbine engine that helps engine efficiency by decreasing slop or play of a rotor shaft of the gas turbine engine.

A gas turbine engine includes rotating spools or rotor shafts with blades that compress air needed for operation. In some designs, a single thrust bearing supports the rotor shafts in the compressor. One of the major goals in gas turbine engine fabrication is to optimize efficiency of the compressor and the turbine so that work is not lost. Tip leakage between the blades and the surrounding case is a significant source of engine inefficiency.

In previous gas turbine engine designs that included a single thrust bearing in the compressor, slop or play would occur between the rotor shafts and the stationary case. This play between the rotor shafts and case is problematic because such play may result in the blades rubbing into the surrounding case or rub strip thereby creating larger gaps between the blade tips and the surrounding case and increasing tip leakage and engine inefficiency. In some cases, the play of the rotor shafts can also create gaps between many of the components in the compressor and/or turbine sections of the gas turbine engine that can also cause air leakage and decrease engine efficiency.

Some prior art engines include a roller bearing assembly in addition to the thrust bearing assembly to help dampen and reduce the play of the rotor shaft. In some cases, the roller bearing is damped by pressurized oil. However, delivering pressurized oil to the roller bearing assembly is difficult due to the tight space constraints in the thrust bearing compartment for oil delivering tubes and nozzles.

SUMMARY

In one aspect of the disclosure, a gas turbine engine includes a bearing support ring with a first annular body and a second annular body disposed radially inward of the first annular body relative a center axis of the gas turbine engine. The bearing support ring also includes a radial spring connected to the first annular body and the second annular body. The radial spring extends circumferentially about the center axis and extends radially between the first annular body and the second annular body. The gas turbine engine also includes a frame with a case and an annular member. The case extends circumferentially around the first annular body of the bearing support ring. The annular member is connected to the case and is positioned radially between the radial spring and the second annular body of the bearing support ring. The annular member extends circumferentially around the second annular body. A fluid port extends radially through the annular member. A seal is disposed around the annular member of the frame and axially forward of the fluid port. The seal extends radially between the annular member and the radial spring of the bearing support ring. A first fluid passage extends through the case and is positioned axially over the first annular body. A second fluid passage is formed between the bearing support ring and the case and the annular member of the frame. The second fluid passage extends from the first fluid passage to the fluid port. A bearing outer race is disposed radially inward of the second annular body of the bearing support ring.

In another aspect of the disclosure, a gas turbine engine includes a frame having a case and an annular member. The case extends circumferentially around a center axis of the gas turbine engine and the annular member is connected to the case and disposed radially inward of the case. The annular member extends circumferentially around the center axis and a fluid port extends radially through the annular member. The gas turbine engine also includes a bearing support ring. The bearing support ring includes a first annular body, a second annular body, a first bow, and a second bow. The first annular body is disposed radially inward of the case and radially outward of the annular member, and extends axially between a forward end and an aft end. The second annular body is disposed radially inward of the annular member of the frame and extends axially between a forward end and an aft end. The first bow is connected to the aft end of the first annular body and curves radially inward and axially forward. The second bow is connected to the first bow and curves radially inward to connect with the forward end of the second annular body. The annular member of the frame extends axially forward toward the second bow and is disposed radially between the first bow and the second annular body. A seal is disposed around the annular member of the frame and is disposed axially forward of the fluid port. The seal extends radially between the annular member and the first bow of the bearing support ring. A first fluid passage extends through the case. A second fluid passage is formed between the bearing support ring and the case and the annular member of the frame. The second fluid passage extends from the first fluid passage to the fluid port. A bearing outer race is disposed radially inward of the second annular body of the bearing support ring and is connected to the second annular body.

In another aspect of the disclosure, a gas turbine engine includes a bearing support ring having a first annular body, a second annular body, and a resilient member. The first annular body extends axially aftward from a first end of the bearing support ring relative a center axis of the gas turbine engine. The second annular body extends axially forward from a second end of the bearing support ring. The second annular body and the second end of the bearing support ring are disposed radially inward from the first annular body and the first end. The resilient member is connected to the first annular body and the second annular body. The resilient member extends circumferentially about the center axis and extends radially between the first annular body and the second annular body. The gas turbine engine also includes a frame having a case and an annular member. The case extends circumferentially around the first annular body of the bearing support ring. The annular member is connected to the case and is positioned radially between the resilient member and the second annular body of the bearing support ring. The annular member extends circumferentially around the second annular body and a fluid port extends radially through the annular member. A seal is disposed around the annular member of the frame and is disposed axially forward of the fluid port. The seal extends radially between the annular member and the resilient member of the bearing support ring. A first fluid passage extends through the case and is positioned axially over the first annular body. A second fluid passage is formed between the bearing support ring and the case and the annular member of the frame. The second fluid passage extends from the first fluid passage to the fluid port. A bearing outer race is disposed radially inward of the second annular body of the bearing support ring and is connected to the second annular body.

Persons of ordinary skill in the art will recognize that other aspects and embodiments of the present invention are possible in view of the entirety of the present disclosure, including the accompanying figures.

While the above-identified drawing figures set forth one or more embodiments of the invention, other embodiments are also contemplated. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings. Like reference numerals identify similar structural elements.

DETAILED DESCRIPTION

The disclosure relates to a thrust bearing system in a high pressure compressor section of a gas turbine engine. The thrust bearing system includes a bearing support ring configured to support a roller bearing assembly disposed adjacent a ball bearing assembly. The bearing support ring is connected to a case and forms a fluid passage between the bearing support ring and the case. The bearing support ring and the case also form a squeeze film damper that reduces radial play of the rotor shaft and blades in the high pressure compressor. Pressurized oil is delivered to the squeeze film damper by the fluid passage between the bearing support ring and the case. Because the fluid passage delivers pressurized oil to the squeeze film damper, the limited space within the thrust bearing compartment does not have to accommodate oil delivery tubes and nozzles for the squeeze film damper.

Figure 1:
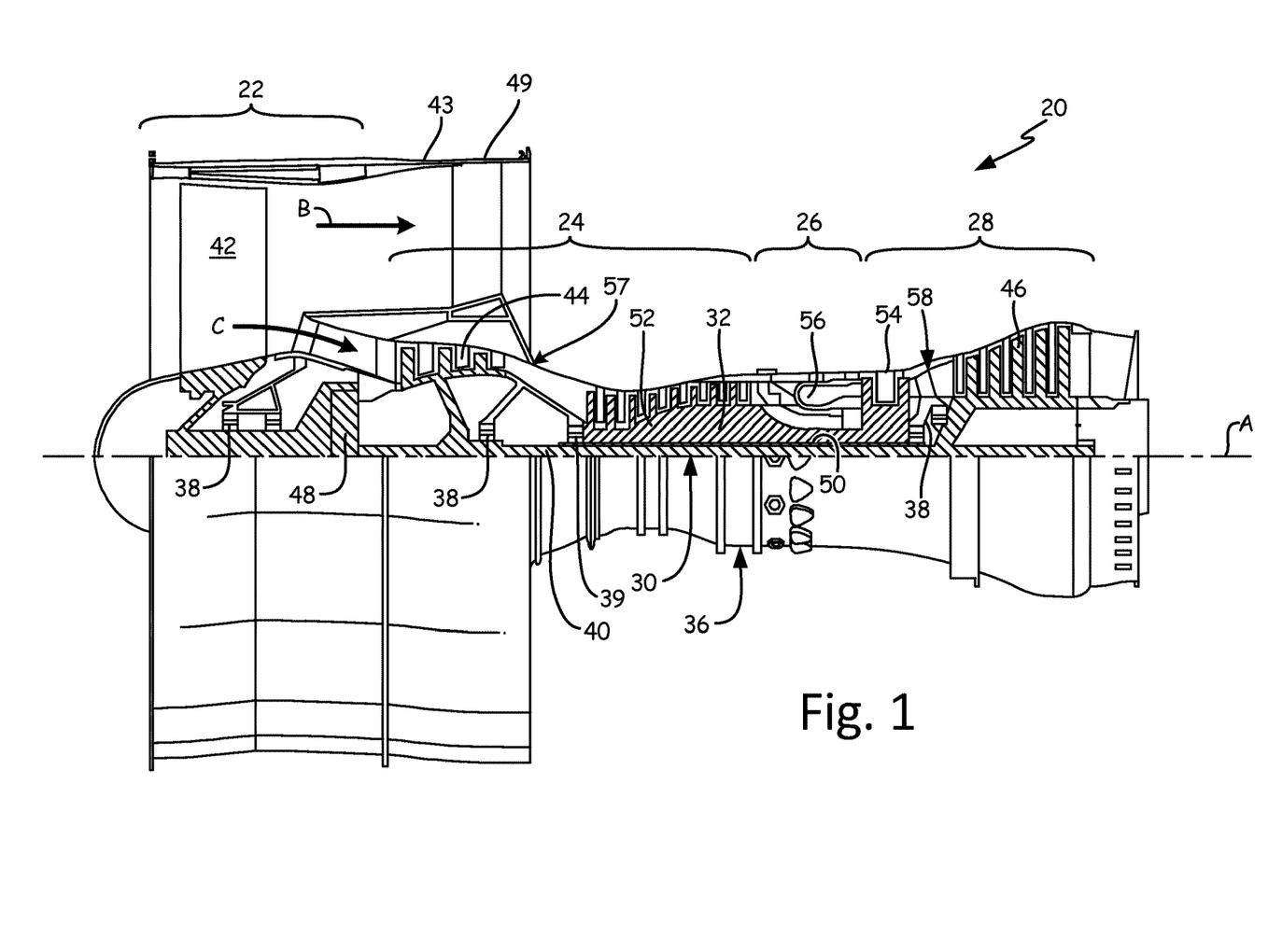
FIG. 1 is a partial cross-sectional view of a gas turbine engine.

FIG. 1 schematically illustrates a gas turbine engine 20. Gas turbine engine 20 is a two-spool turbofan gas turbine engine that generally includes fan section 22, compressor section 24, combustion section 26, and turbine section 28. Other examples may include an augmentor section (not shown) among other systems or features. Fan section 22 drives air along bypass flowpath B while compressor section 24 drives air along a core flowpath C. Compressed air from compressor section 24 is directed into combustion section 26 where the compressed air is mixed with fuel and ignited. The products of combustion exit combustion section 26 and expand through turbine section 28.

Although the disclosed non-limiting embodiment depicts a two-spool turbofan gas turbine engine, it should be understood that the concepts described herein are not limited to use with two-spool turbofans as the teachings may be applied to other types of turbine engines; for example, an industrial gas turbine; a reverse-flow gas turbine engine; and a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

Gas turbine engine 20 generally includes low-speed spool 30 and high-speed spool 32 mounted for rotation about a center axis A relative to engine static structure 36. Low-speed spool 30 and high-speed spool 32 are rotatably supported by bearing systems 38 and thrust bearing system 39. Low-speed spool 30 interconnects fan 42, low-pressure compressor 44, and low-pressure turbine 46. Low-speed spool 30 generally includes inner shaft 40, geared architecture 48, and fan drive shaft 68. Fan 42 is connected to fan drive shaft 68. Inner shaft 40 is connected to fan drive shaft 68 through geared architecture 48 to drive fan 42 at a lower speed than the rest of low-speed spool 30. Fan 42 is considered a ducted fan as fan 42 is disposed within duct 49 formed by fan case 43. Geared architecture 48 of gas turbine engine 20 is a fan drive gear box that includes an epicyclic gear train, such as a planetary gear system or other gear system. The example epicyclic gear train has a gear reduction ratio of greater than about 2.3 (2.3:1).

High-speed spool 32 includes outer shaft 50 that interconnects high-pressure compressor 52 and high-pressure turbine 54. Combustion section 26 includes a circumferentially distributed array of combustors 56 generally arranged axially between high-pressure compressor 52 and high-pressure turbine 54. In gas turbine engine 20, the core airflow C is compressed by low-pressure compressor 44 then high-pressure compressor 52, mixed and burned with fuel in combustors 56, then expanded over the high-pressure turbine 54 and low-pressure turbine 46. High-pressure turbine 54 and low-pressure turbine 46 rotatably drive high-speed spool 32 and low-speed spool 30 respectively in response to the expansion.

Intermediate frame 57 of engine static structure 36 is generally arranged axially between low-pressure compressor 44 and high-pressure compressor 52. Intermediate frame 57 supports bearing systems 38 and thrust bearing system 39 in the compressor 24 and provides a load path for transferring thrust loads from thrust bearing system 39 to fan case 43. Mid-turbine frame 58 of engine static structure 36 is generally arranged axially between high-pressure turbine 54 and low-pressure turbine 46. Mid-turbine frame 58 supports bearing systems 38 in the turbine section 28. Inner shaft 40 and outer shaft 50 are concentric and rotate via bearing systems 38 and thrust bearing system 39 about engine center axis A, which is collinear with the longitudinal axes of inner shaft 40 and outer shaft 50. As discussed below with reference to FIGS. 2 and 3, thrust bearing system 39 is radially loaded to reduce radial play of inner shaft 40, outer shaft 50, and the rotor blades in the compressor section 24 connected to those shafts.

Figure 2:
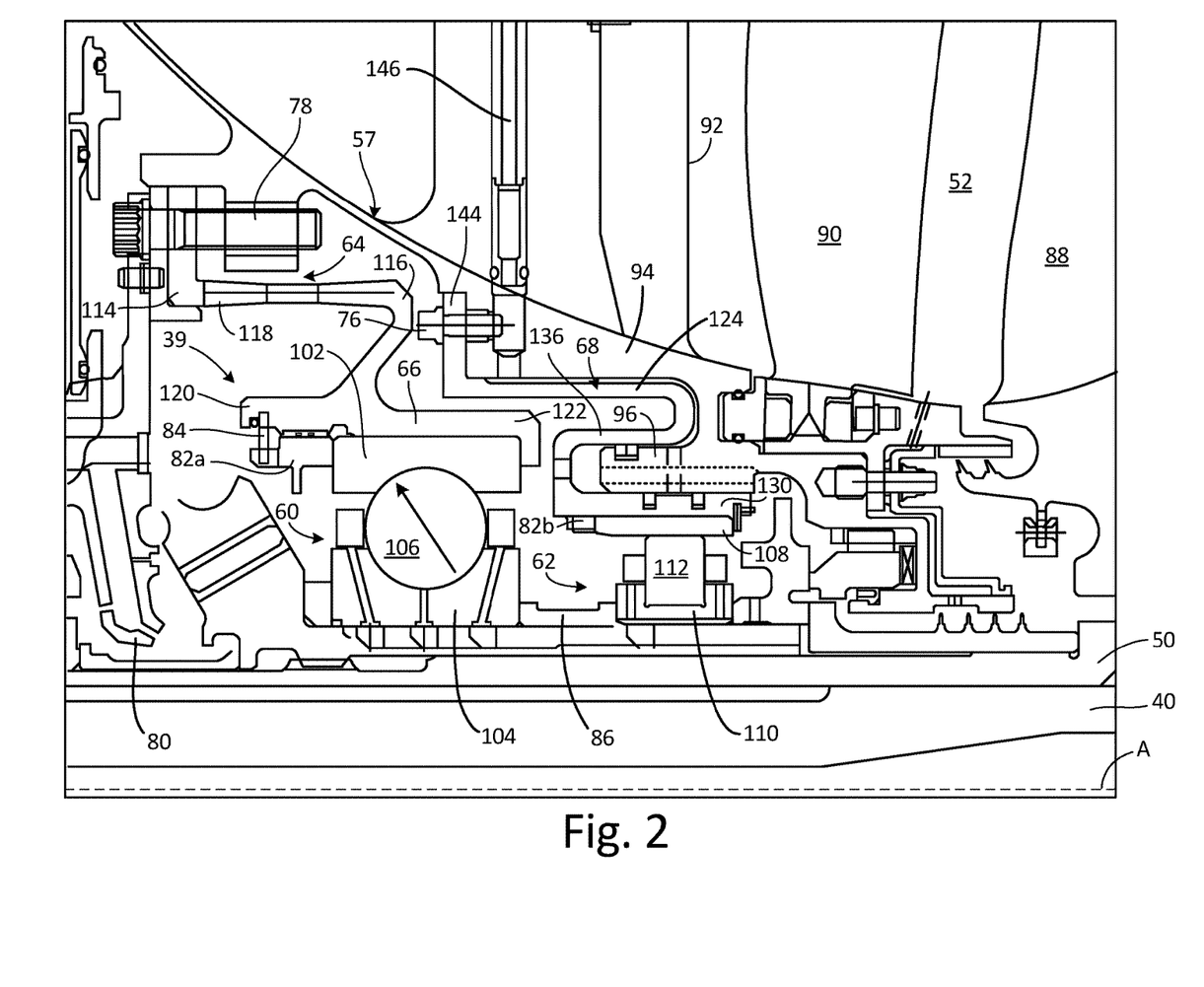
FIG. 2 is a cross-sectional view of a thrust bearing system for the gas turbine engine of FIG. 1.
Figure 3:
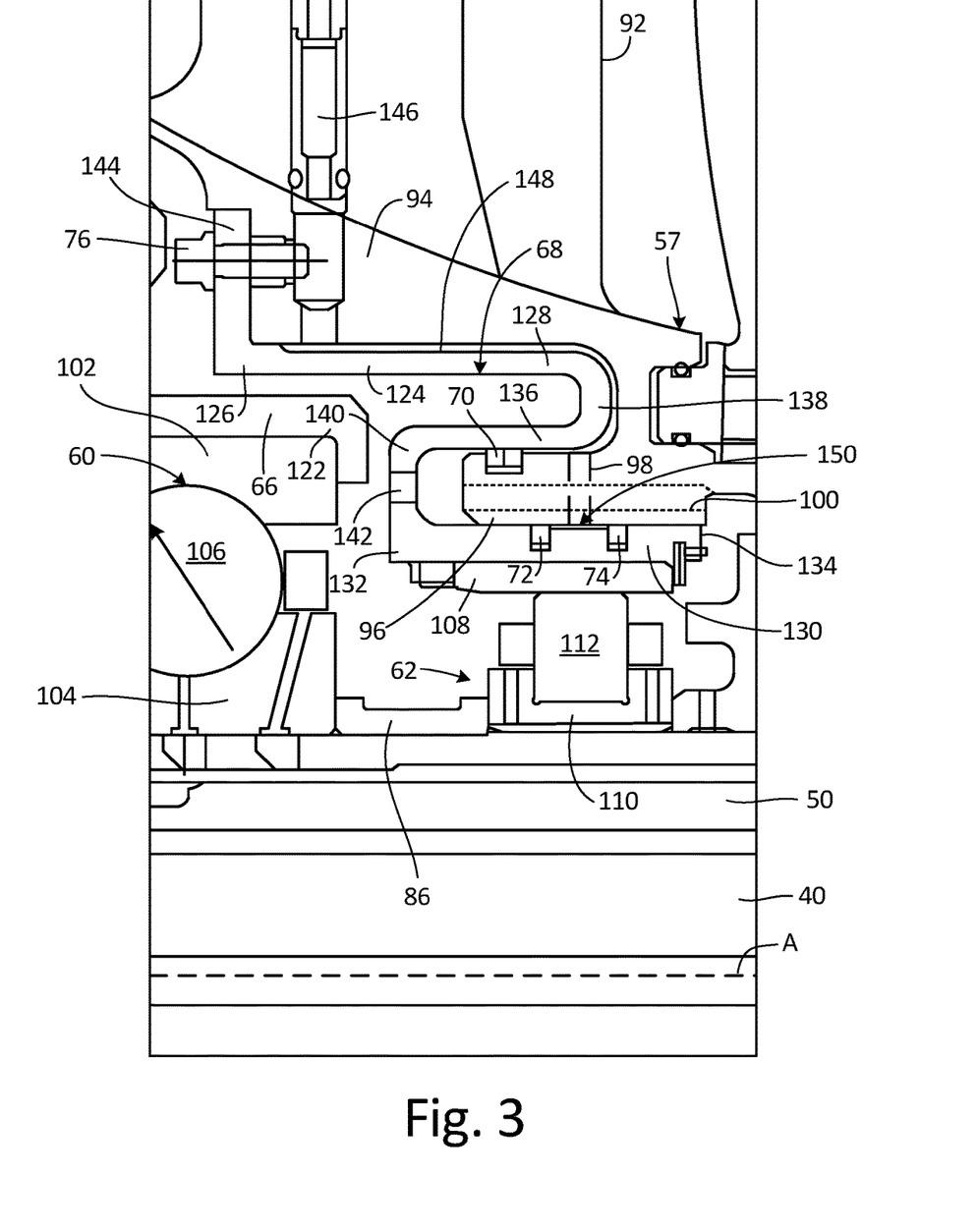
FIG. 3 is an enlarged cross-sectional view of the thrust bearing system from FIG. 2.

FIGS. 2 and 3 will be discussed concurrently. FIG. 2 is a cross-sectional view of a portion of high-pressure compressor 52, intermediate frame 57, and thrust bearing system 39 for gas turbine engine 20 of FIG. 1. FIG. 3 is an enlarged cross-sectional view of thrust bearing system 39 from FIG. 2. As shown in FIGS. 2 and 3, thrust bearing system 39 includes ball bearing assembly 60, roller bearing assembly 62, squirrel cage 64, ball bearing housing 66, bearing support ring 68, first seal 70, second seal 72, third seal 74, ring fasteners 76, cage fasteners 78, supply nozzle 80, spanner nuts 82a and 82b, anti-rotation washer 84, and race spacer 86. High-pressure compressor 52 includes rotor blades 88 and vanes 90. Intermediate frame 57 includes struts 92, case 94, annular member 96, fluid port 98, and scavenge passage 100. As shown in FIGS. 2 and 3, ball bearing assembly 60 includes ball bearing outer race 102, ball bearing inner race 104, and ball bearing elements 106. Roller bearing assembly 62 includes roller bearing outer race 108, roller bearing inner race 110, and roller bearing elements 112. Squirrel cage 64 includes forward end 114, aft end 116, and a plurality of beams 118. Ball bearing housing 66 includes forward end 120 and aft end 122. Bearing support ring 68 includes first annular body 124 with forward end 126 and aft end 128, second annular body 130 with forward end 132 and aft end 134, and radial spring 136. Radial spring 136 includes first bow 138, second bow 140, and drain hole 142. Bearing support ring 68 also includes mounting flange 144. First fluid passage 146, second fluid passage 148, and squeeze film oil damper 150 are also shown and labeled in FIG. 3.

As shown in FIG. 2, thrust bearing system 39 is positioned circumferentially around inner shaft 40 and outer shaft 50, and positioned radially inward from intermediate frame 57. Both intermediate frame 57 and thrust bearing system 39 are positioned immediately upstream from high-pressure compressor 52. Intermediate frame 57 is stationary and does not rotate about inner shaft 40 and outer shaft 50.

Case 94 of intermediate frame 57 extends circumferentially around center axis A, inner shaft 40, and outer shaft 50. Case 94 is spaced radially from outer shaft 50 so as to form a compartment for thrust bearing system 39. Case 94 of intermediate frame 57 circumferentially surrounds thrust bearing system 39 and encloses thrust bearing system 39 so as to separate thrust bearing system 39 from core airflow C. Case 94 also forms a radially inner endwall for the flowpath across high-pressure compressor 52. Struts 92, only one of which is shown in FIGS. 2 and 3, of intermediate frame 57 extend radially outward from case 94 to connect case 94 to an outer case (not shown) of intermediate frame 57. Each of struts 92 can include first fluid passage 146. First fluid passage 146 extends radially through strut 92 and case 94.

Annular member 96 is disposed radially inward from case 94 relative center axis A and is connected to case 94 proximate an aft end of case 94. Annular member 96 extends circumferentially around center axis A and outer shaft 50 and can be a cylindrical tube in shape. As shown in FIG. 3, fluid port 98 is a single passage that extends radially through annular member 96.

Bearing support ring 68 is disposed radially within case 94 and is connected to case 94 and roller bearing assembly 62 to support roller bearing assembly 62 relative case 94. Bearing support ring 68 can be formed from any metal, such as steal, titanium, and/or nickel, that provides the necessary thermal and mechanical durability and elasticity required for the applications of bearing support ring 68 described below. First annular body 124 of bearing support ring 68 is disposed within case 94 and is positioned radially between case 94 and annular member 96. As shown in FIG. 3, first annular body 124 extends axially aft from forward end 126 to aft end 128 and extends circumferentially around annular member 96 and center axis A. Forward end 126 of first annular body 124 forms a first end of bearing support ring 68. First annular body 124 is positioned relative case 94 such that first fluid passage 146 is positioned axially over first annular body 124. Mounting flange 144 is connected to forward end 126 of first annular body 124. Mounting flange 144 extends radially outward from forward end 126 of first annular body 124. Ring fasteners 76 are inserted into holes formed in mounting flange 144 and case 94 to connect mounting flange 144 and bearing support ring 68 to case 94 of intermediate frame 57.

Second annular body 130 of bearing support ring 68 is disposed radially inward of both first annular body 124 and annular member 96 of the intermediate frame 57. Second annular body 130 extends axially between a forward end 132 and an aft end 134. Aft end 134 of second annular body 130 forms a second end of bearing support ring 68. Second annular body 130 of bearing support ring 68 extends circumferentially around center axis A while annular member 96 of intermediate frame 57 extends circumferentially around second annular body 130.

Radial spring 136 is a resilient member that extends circumferentially about center axis A and extends radially between first annular body 124 and second annular body 130. Radial spring 136 is connected to first annular body 124 and second annular body 130. As shown best in the exemplary embodiment of FIG. 3, radial spring 136 can be a folded bellows spring with first bow 138 and second bow 140. First bow 138 is connected to aft end 128 of first annular body 124 and curves radially inward and axially forward. First bow 138 can be axially aligned with roller bearing assembly 62. Second bow 140 is connected to first bow 138 and curves radially inward to connect with forward end 132 of second annular body 130. Radial spring 136 is positioned relative annular member 96 of intermediate frame 57 such that annular member 96 extends axially forward toward second bow 140 and is disposed radially between first bow 138 of radial spring 136 and second annular body 130. As discussed in greater detail below, first bow 138 and second bow 140 provide elasticity to radial spring 136 and bearing support ring 68 so that squeeze film oil damper 150 can radially deflect second annular body 130 radially inward against roller bearing assembly 62. First bow 138 also helps form second fluid passage 148 for squeeze film oil damper 150.

Roller bearing assembly 62 is disposed radially inward of second annular body 130 of bearing support ring 68. Roller bearing outer race 108 is disposed immediately radially inward of second annular body 130 of bearing support ring 68 and is non-rotationally connected to second annular body 130. Roller bearing inner race 110 is disposed radially inward of roller bearing outer race 108. Roller bearing elements 112 are disposed radially between roller bearing outer race 108 and roller bearing inner race 110. Spanner nut 82b can be connected to a radially inner surface of second annular body 130 to axially restrain roller bearing assembly 62 relative bearing support ring 68. During start-up of gas turbine engine 20, second annular body 130 of radial spring 136 is pressed radially inward by squeeze film oil damper 150 so that roller bearing outer race 108 is pressed against roller bearing elements 112 to inhibit radial play roller bearing assembly 62. As discussed below in greater detail, annular member 96, bearing support ring 68, first seal 70, second seal 72, third seal 74, second fluid passage 148, and fluid port 98 make up squeeze film oil damper 150 in thrust bearing system 39.

As shown in FIG. 3, a small gap exists between bearing support ring 68 and case 94 and annular member 96 so as to form second fluid passage 148 between bearing support ring 68 and case 94 and annular member 96. Second fluid passage 148 extends from first fluid passage 146 to fluid port 98. First seal 70 is disposed around annular member 96 of intermediate frame 57 and is disposed axially forward of fluid port 98. First seal 70 extends radially between annular member 96 and radial spring 136 of bearing support ring 68 proximate first bow 138. First seal 70 defines an end of second fluid passage 148 and forces oil flowing in second fluid passage 148 into fluid port 98 of annular member 96 of intermediate frame 57. Second seal 72 extends circumferentially around second annular body 130 of bearing support ring 68, and is disposed axially forward of fluid port 98. Second seal 72 extends radially between second annular body 130 and annular member 96 of intermediate frame 57. Third seal 74 extends circumferentially around second annular body 130 of bearing support ring 68, and is disposed axially aft of second seal 72 and fluid port 98. Similar to second seal 72, third seal 74 extends radially between second annular body 130 and annular member 96 of intermediate frame 57. First seal 70, second seal 72, and third seal 74 are piston seals. First seal 70 can include two piston seals stacked axially against one another.

Figure 4:
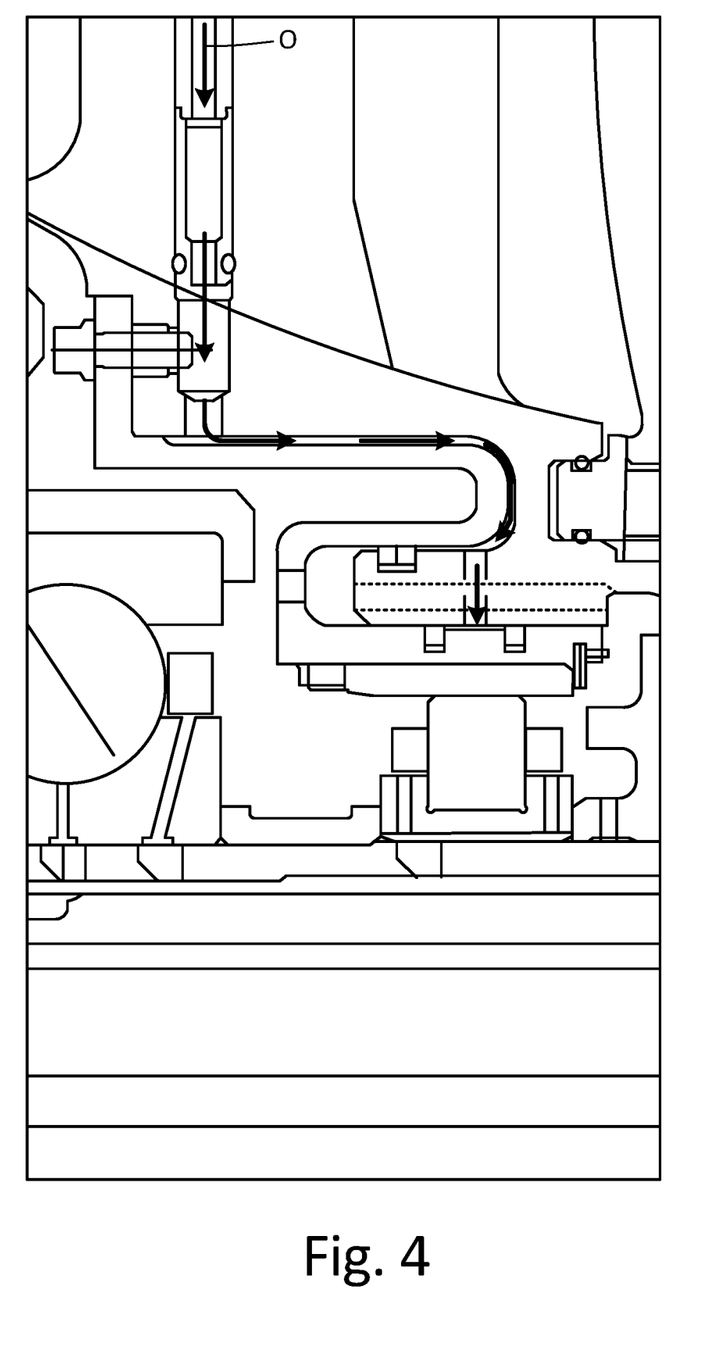
FIG. 4 is another enlarged cross-sectional view of the thrust bearing system showing the flow of a pressurized fluid through a squeeze film oil damper.

During start-up of gas turbine engine 20, squeeze film oil damper 150 is activated when pressurized oil O is directed into first fluid passage 146, as shown in FIG. 4. First fluid passage 146 directs pressurized oil O into second fluid passage 148 between bearing support ring 68 and case 94. Pressurized oil O then travels between bearing support ring 68 and case 94 until reaching first seal 70 and fluid port 98 in annular member 96. Pressurized oil O then travels radial inward through fluid port 98 to second annular body 130 of bearing support ring 68. Once pressurized oil O reaches second annular body 130, second seal 72 and third seal 74 stops the advancement of pressurized oil O and causes back pressure to form in oil O between annular member 96 and second annular body 130. This back pressure in oil O pushes second annular body 130 radially inward against roller bearing assembly 62. Squeeze film oil damper 150 can continue to push second annular body 130 radially inward against roller bearing assembly 62 after engine start-up and throughout engine operation. Because squeeze film oil damper 150 presses second annular body 130 radially inward against roller bearing assembly 62 during engine start-up and operation, squeeze film oil damper 150 reduces radial play and radial slop in roller bearing assembly 62, outer shaft 50, and inner shaft 40.

Ball bearing assembly 60, shown best in FIG. 2, is disposed radially inward of the case 94 and positioned axially forward of second annular body 130 of bearing support ring 68 and forward of roller bearing assembly 62. Ball bearing assembly 60 is larger in diameter than roller bearing assembly 62. The majority of the thrust loads transferred to intermediate frame 57 from outer shaft 50 and inner shaft 40 are transferred to intermediate frame 57 through ball bearing assembly 60. Squirrel cage 64, shown in FIG. 2, radially supports and dampens ball bearing assembly 60.

Squirrel cage 64 is disposed radially inward of case 94 and positioned forward of bearing support ring 68. Beams 118 of squirrel cage 64 (only one of which is shown in FIG. 2) extend axially between forward end 114 and aft end 116 of squirrel cage 64. Beams 118 are circumferentially spaced from one another around center axis A to create windows and increase the radial flexibility of squirrel cage 64. Cage fasteners 78 (only one of which is shown in FIG. 2) removably connect forward end 114 of squirrel cage 64 to case 94 of intermediate frame 57. Cage fasteners 78 can be threaded fasteners, such as bolts. As shown in FIG. 2, squirrel cage 64 is connected to case 94 independent of bearing support ring 68. Squirrel cage 64 is connected to ball bearing housing 66 of thrust bearing system 39 and functions as a radial centering spring and support cage for ball bearing assembly 60. Squirrel cage 64 can be formed from any metal, such as steal, titanium, and/or nickel, that provides the necessary thermal and mechanical durability and elasticity required for the applications of squirrel cage 64.

Ball bearing housing 66 is disposed radially inward of squirrel cage 64 and is connected to aft end 116 of squirrel cage 64. Ball bearing housing 66 can be at least partially nested in first annular body 124 of bearing support ring 68 such that ball bearing housing 66 is disposed radially inward of first annular body 124 and aft end 122 of ball bearing housing 66 is positioned axially aft of forward end 126 of first annular body 124 and is positioned axially forward of radial spring 136 of bearing support ring 68. Ball bearing outer race 102 is disposed radially inward of ball bearing housing 66, and ball bearing inner race 104 is disposed radially inward of ball bearing outer race 102. Ball bearing elements 106 are disposed radially between ball bearing outer race 102 and ball bearing inner race 104. Ball bearing housing 66, ball bearing outer race 102, ball bearing inner race 104, and ball bearing elements 106 are positioned axially forward of second annular body 130 of bearing support ring 68 and roller bearing assembly 62. Spanner nut 82a and anti-rotation washer 84 axially position and restrain ball bearing outer race 102 relative ball bearing housing 66. Race spacer 86 axially positions ball bearing inner race 104 relative roller bearing assembly 62.

Figure 5:
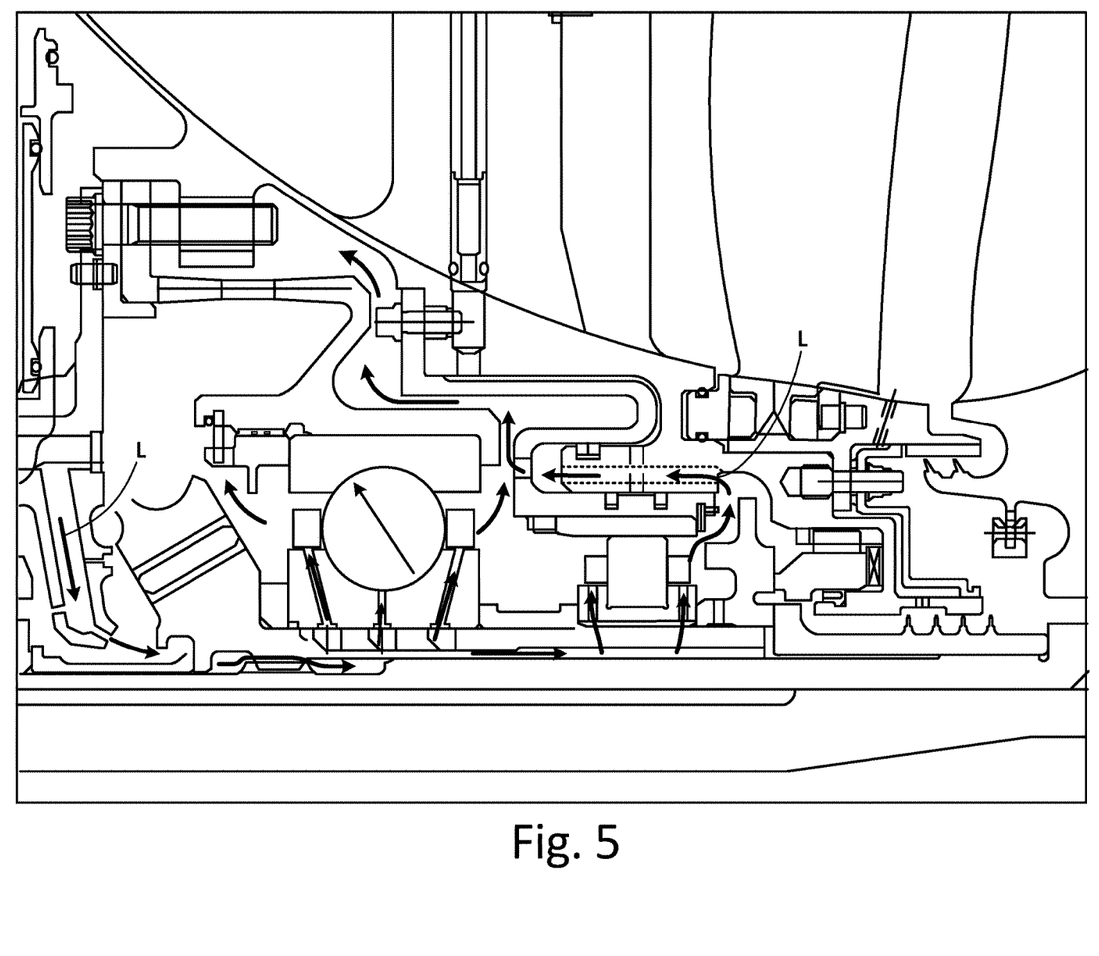
FIG. 5 is another cross-sectional view of the thrust bearing system showing the flow of a lubricating fluid through the thrust bearing system.

Supply nozzle 80 (shown in FIG. 2) is positioned forward of ball bearing assembly and is configured to deliver lubricating oil to outer shaft 50, ball bearing inner race 104, and roller bearing inner race 110. During operation of gas turbine engine 20 and thrust bearing system 39, lubricating oil L (shown in FIG. 5) travels radially outward from outer shaft 50, ball bearing inner race 104, and roller bearing inner race 110 toward case 94. Scavenge passages 100 (only one of which is shown in FIG. 3) and drain hole 142 are provided so that the lubricating oil can travel forward and across annular member 96 and bearing support ring 68 toward case 94. Scavenge passages 100, only one of which is shown in phantom in FIG. 3, extend axially through an entire axial length of annular member 96 of intermediate frame 57. Scavenge passages 100 extend through annular member 96 without intersecting radial fluid port 98 so that scavenge passages 100 do not interfere with squeeze film oil damper 150. Drain hole 142 extends axially through second bow 140 of bearing support ring 68 and is in fluidic communication with scavenge passage 100.

In view of the foregoing description, it will be recognized that the present disclosure provides numerous advantages and benefits. For example, the present disclosure provides squeeze film oil damper 150 that opposes and minimizes any radial deflection in outer shaft 50. Furthermore, the present disclosure provides second fluid passage 148 and fluid port 98 that supplies pressurized oil to squeeze film oil damper 150 without the use of tubes or nozzles. Eliminating the use of tubes and nozzles in squeeze film oil damper 150 reduces the complexity of thrust bearing system 39 and the overall weight of gas turbine engine 20.

The following are non-exclusive descriptions of possible embodiments of the present invention.

In one embodiment, a gas turbine engine includes a bearing support ring with a first annular body and a second annular body disposed radially inward of the first annular body relative a center axis of the gas turbine engine. The bearing support ring also includes a radial spring connected to the first annular body and the second annular body. The radial spring extends circumferentially about the center axis and extends radially between the first annular body and the second annular body. The gas turbine engine also includes a frame with a case and an annular member. The case extends circumferentially around the first annular body of the bearing support ring. The annular member is connected to the case and is positioned radially between the radial spring and the second annular body of the bearing support ring. The annular member extends circumferentially around the second annular body. A fluid port extends radially through the annular member. A seal is disposed around the annular member of the frame and axially forward of the fluid port. The seal extends radially between the annular member and the radial spring of the bearing support ring. A first fluid passage extends through the case and is positioned axially over the first annular body. A second fluid passage is formed between the bearing support ring and the case and the annular member of the frame. The second fluid passage extends from the first fluid passage to the fluid port. A bearing outer race is disposed radially inward of the second annular body of the bearing support ring.

The gas turbine engine of the preceding paragraph can optionally include, additionally and/or alternatively, any one or more of the following features, configurations and/or additional components:

a second seal extending circumferentially around the second annular body of the bearing support ring, disposed axially forward of the fluid port, and extending radially between the second annular body and the annular member of the frame; and a third seal extending circumferentially around the second annular body of the bearing support ring, disposed axially aft of the fluid port, and extending radially between the second annular body and the annular member of the frame;

the seal, the second seal, and the third seal are piston seals;

the bearing support ring further comprises: a mounting flange connected to a forward end of the first annular body, wherein the mounting flange extends radially outward from the forward end of the first annular body;

at least one fastener connecting the mounting flange to the case of the frame;

a bearing inner race disposed radially inward of the bearing outer race; and a plurality of roller bearing elements disposed radially between the bearing outer race and the bearing inner race;

a squirrel cage disposed radially inward of the case and positioned forward of the bearing support ring, wherein the squirrel cage comprises a forward end, an aft end, and a plurality of circumferentially spaced beams extending between the forward end and the aft end of the bearing support cage;

a ball bearing housing disposed radially inward of the squirrel cage and connected to the aft end of the squirrel cage; a ball bearing outer race disposed radially inward of the ball bearing housing; a ball bearing inner race disposed radially inward of the ball bearing outer race; and a plurality of ball bearing elements disposed radially between the ball bearing outer race and the ball bearing inner race;

the ball bearing housing, the ball bearing outer race, the ball bearing inner race, and the plurality of ball bearing elements are positioned axially forward of the second annular body of the bearing support ring, the bearing outer race, the bearing inner race, and the plurality of roller bearing elements; and/or the ball bearing housing comprises a forward end and an aft end, wherein the aft end of the ball bearing housing is positioned axially aft of a forward end of the first annular body of the bearing support ring and positioned axially forward of the radial spring of the bearing support ring.

In another embodiment, an assembly for a gas turbine engine includes a frame having a case and an annular member. The case extends circumferentially around a center axis of the gas turbine engine and the annular member is connected to the case and disposed radially inward of the case. The annular member extends circumferentially around the center axis and a fluid port extends radially through the annular member. The gas turbine engine also includes a bearing support ring. The bearing support ring includes a first annular body, a second annular body, a first bow, and a second bow. The first annular body is disposed radially inward of the case and radially outward of the annular member, and extends axially between a forward end and an aft end. The second annular body is disposed radially inward of the annular member of the frame and extends axially between a forward end and an aft end. The first bow is connected to the aft end of the first annular body and curves radially inward and axially forward. The second bow is connected to the first bow and curves radially inward to connect with the forward end of the second annular body. The annular member of the frame extends axially forward toward the second bow and is disposed radially between the first bow and the second annular body. A seal is disposed around the annular member of the frame and is disposed axially forward of the fluid port. The seal extends radially between the annular member and the first bow of the bearing support ring. A first fluid passage extends through the case. A second fluid passage is formed between the bearing support ring and the case and the annular member of the frame. The second fluid passage extends from the first fluid passage to the fluid port. A bearing outer race is disposed radially inward of the second annular body of the bearing support ring and is connected to the second annular body.

The assembly of the preceding paragraph can optionally include, additionally and/or alternatively, any one or more of the following features, configurations and/or additional components:

the frame further comprises: a strut extending radially outward from the case;

the first fluid passage extends radially through the strut;

the frame further comprises: a scavenge passage extending axially through an entire axial length of the annular member of the frame, wherein the scavenge passage does not intersect the radial fluid port;

the bearing support ring further comprises: a drain hole extending axially through the second bow of the bearing support ring and in fluidic communication with the scavenge passage; and/or a second seal extending circumferentially around the second annular body of the bearing support ring, disposed axially forward of the fluid port, and extending radially between the second annular body and the annular member of the frame; and a third seal extending circumferentially around the second annular body of the bearing support ring, disposed axially aft of the fluid port, and extending radially between the second annular body and the annular member of the frame.

In another embodiment, a gas turbine engine includes a bearing support ring having a first annular body, a second annular body, and a resilient member. The first annular body extends axially aftward from a first end of the bearing support ring relative a center axis of the gas turbine engine.

The second annular body extends axially forward from a second end of the bearing support ring. The second annular body and the second end of the bearing support ring are disposed radially inward from the first annular body and the first end. The resilient member is connected to the first annular body and the second annular body. The resilient member extends circumferentially about the center axis and extends radially between the first annular body and the second annular body. The gas turbine engine also includes a frame having a case and an annular member. The case extends circumferentially around the first annular body of the bearing support ring. The annular member is connected to the case and is positioned radially between the resilient member and the second annular body of the bearing support ring. The annular member extends circumferentially around the second annular body and a fluid port extends radially through the annular member. A seal is disposed around the annular member of the frame and is disposed axially forward of the fluid port. The seal extends radially between the annular member and the resilient member of the bearing support ring. A first fluid passage extends through the case and is positioned axially over the first annular body. A second fluid passage is formed between the bearing support ring and the case and the annular member of the frame. The second fluid passage extends from the first fluid passage to the fluid port. A bearing outer race is disposed radially inward of the second annular body of the bearing support ring and is connected to the second annular body.

The gas turbine engine of the preceding paragraph can optionally include, additionally and/or alternatively, any one or more of the following features, configurations and/or additional components:

a second seal extending circumferentially around the second annular body of the bearing support ring, disposed axially forward of the fluid port, and extending radially between the second annular body and the annular member of the frame; and a third seal extending circumferentially around the second annular body of the bearing support ring, disposed axially aft of the fluid port, and extending radially between the second annular body and the annular member of the frame;

a bearing inner race disposed radially inward of the bearing outer race; and a plurality of roller bearing elements disposed radially inward of the bearing outer race; and/or a ball bearing assembly disposed radially inward of the case and positioned axially forward of the second annular body of the bearing support ring.

Any relative terms or terms of degree used herein, such as "substantially", "essentially", "generally", "approximately", and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, transitory vibrations and sway movements, temporary alignment or shape variations induced by operational conditions, and the like.

While the invention has been described with reference to an exemplary embodiment(s), it will be understood by those skilled in the art that various changes may be made and equivalents may be substituted for elements thereof without departing from the scope of the invention. For example, while the present disclosure describes bearing support ring 68 and roller bearing assembly 62 being disposed aft of ball bearing assembly 60, bearing support ring 68 and roller bearing assembly 62 could be disposed forward of ball bearing assembly 60. In addition, many modifications may be made to adapt a particular situation or material to the teachings of the invention without departing from the essential scope thereof. For example, the present disclosure could be adapted for turbine section 28. Therefore, it is intended that the invention not be limited to the particular embodiment(s) disclosed, but that the invention will include all embodiments falling within the scope of the appended claims.

The invention claimed is:

1. A gas turbine engine comprising:
   a bearing support ring, wherein the bearing support ring comprises:
      a first annular body;
      a second annular body disposed radially inward of the first annular body relative a center axis of the gas turbine engine; and
      a radial spring connected to the first annular body and the second annular body, wherein the radial spring extends circumferentially about the center axis and extends radially between the first annular body and the second annular body;
   a frame comprising;
      a case extending circumferentially around the first annular body of the bearing support ring;
      an annular member connected to the case and positioned radially between the radial spring and the second annular body of the bearing support ring, wherein the annular member extends circumferentially around the second annular body; and
      a fluid port extending radially through the annular member;
   a seal disposed around the annular member of the frame, disposed axially forward of the fluid port, and extending radially between the annular member and the radial spring of the bearing support ring;
   a first fluid passage extending through the case and axially positioned over the first annular body;
   a second fluid passage formed between the bearing support ring and the case and the annular member of the frame, wherein the second fluid passage extends from the first fluid passage to the fluid port; and
   a bearing outer race disposed radially inward of the second annular body of the bearing support ring.

2. The gas turbine engine of claim 1 further comprising:
   a second seal extending circumferentially around the second annular body of the bearing support ring, disposed axially forward of the fluid port, and extending radially between the second annular body and the annular member of the frame; and
   a third seal extending circumferentially around the second annular body of the bearing support ring, disposed axially aft of the fluid port, and extending radially between the second annular body and the annular member of the frame.

3. The gas turbine engine of claim 2, wherein the seal, the second seal, and the third seal are piston seals.

4. The gas turbine engine of claim 1, wherein the bearing support ring further comprises:
   a mounting flange connected to a forward end of the first annular body, wherein the mounting flange extends radially outward from the forward end of the first annular body.

5. The gas turbine engine of claim 4, wherein the gas turbine engine further comprises:
  at least one fastener connecting the mounting flange to the case of the frame.

6. The gas turbine engine of claim 1, wherein the gas turbine engine further comprises:
  a bearing inner race disposed radially inward of the bearing outer race; and
  a plurality of roller bearing elements disposed radially between the bearing outer race and the bearing inner race.

7. The gas turbine engine of claim 6 further comprising:
  a squirrel cage disposed radially inward of the case and positioned forward of the bearing support ring,
  wherein the squirrel cage comprises a forward end, an aft end, and a plurality of circumferentially spaced beams extending between the forward end and the aft end of the bearing support cage.

8. The gas turbine engine of claim 7 further comprising:
  a ball bearing housing disposed radially inward of the squirrel cage and connected to the aft end of the squirrel cage;
  a ball bearing outer race disposed radially inward of the ball bearing housing;
  a ball bearing inner race disposed radially inward of the ball bearing outer race; and
  a plurality of ball bearing elements disposed radially between the ball bearing outer race and the ball bearing inner race.

9. The gas turbine engine of claim 8, wherein the ball bearing housing, the ball bearing outer race, the ball bearing inner race, and the plurality of ball bearing elements are positioned axially forward of the second annular body of the bearing support ring, the bearing outer race, the bearing inner race, and the plurality of roller bearing elements.

10. The gas turbine engine of claim 9, wherein the ball bearing housing comprises a forward end and an aft end, wherein the aft end of the ball bearing housing is positioned axially aft of a forward end of the first annular body of the bearing support ring and positioned axially forward of the radial spring of the bearing support ring.

11. An assembly for a gas turbine engine comprising:
  a frame comprising;
    a case extending circumferentially around a center axis of the gas turbine engine;
    an annular member connected to the case and disposed radially inward of the case, wherein the annular member extends circumferentially around the center axis;
    a fluid port extending radially through the annular member;
  a bearing support ring, wherein the bearing support ring comprises:
    a first annular body disposed radially inward of the case and radially outward of the annular member, wherein the first annular body extends axially between a forward end and an aft end;
    a second annular body disposed radially inward of the annular member of the frame; wherein the second annular body extends axially between a forward end and an aft end;
    a first bow connected to the aft end of the first annular body and curving radially inward and extending axially forward; and
    a second bow connected to the first bow and curving radially inward to connect with the forward end of the second annular body,
    wherein the annular member of the frame extends axially forward toward the second bow and is disposed radially between the first bow and the second annular body;
  a seal disposed around the annular member of the frame, disposed axially forward of the fluid port, and extending radially between the annular member and the first bow of the bearing support ring;
  a first fluid passage extending through the case;
  a second fluid passage formed between the bearing support ring and the case and the annular member of the frame, wherein the second fluid passage extends from the first fluid passage to the fluid port; and
  a bearing outer race disposed radially inward of the second annular body of the bearing support ring and connected to the second annular body.

12. The assembly of claim 11, wherein the frame further comprises:
  a strut extending radially outward from the case.

13. The assembly of claim 12, wherein the first fluid passage extends radially through the strut.

14. The assembly of claim 11, wherein the frame further comprises:
  a scavenge passage extending axially through an entire axial length of the annular member of the frame,
  wherein the scavenge passage does not intersect the fluid port.

15. The assembly of claim 14, wherein the bearing support ring further comprises:
  a drain hole extending axially through the second bow of the bearing support ring and in fluidic communication with the scavenge passage.

16. The assembly of claim 11 further comprising:
  a second seal extending circumferentially around the second annular body of the bearing support ring, disposed axially forward of the fluid port, and extending radially between the second annular body and the annular member of the frame; and
  a third seal extending circumferentially around the second annular body of the bearing support ring, disposed axially aft of the fluid port, and extending radially between the second annular body and the annular member of the frame.

17. A gas turbine engine comprising:
  a bearing support ring, wherein the bearing support ring comprises:
    a first annular body extending axially aftward from a first end of the bearing support ring relative a center axis of the gas turbine engine;
    a second annular body extending axially forward from a second end of the bearing support ring, wherein the second annular body and the second end of the bearing support ring are disposed radially inward from the first annular body and the first end; and
    a resilient member connected to the first annular body and the second annular body, wherein the resilient member extends circumferentially about the center axis and extends radially between the first annular body and the second annular body;
  a frame comprising;
    a case extending circumferentially around the first annular body of the bearing support ring;
    an annular member connected to the case and positioned radially between the resilient member and the second annular body of the bearing support ring, wherein the annular member extends circumferentially around the second annular body; and a fluid port extending radially through the annular member;
a seal disposed around the annular member of the frame, disposed axially forward of the fluid port, and extending radially between the annular member and the resilient member of the bearing support ring;
a first fluid passage extending through the case and axially positioned over the first annular body;
a second fluid passage formed between the bearing support ring and the case and the annular member of the frame, wherein the second fluid passage extends from the first fluid passage to the fluid port; and
a bearing outer race disposed radially inward of the second annular body of the bearing support ring and connected to the second annular body.

18. The gas turbine engine of claim 17 further comprising:
a second seal extending circumferentially around the second annular body of the bearing support ring, disposed axially forward of the fluid port, and extending radially between the second annular body and the annular member of the frame; and
a third seal extending circumferentially around the second annular body of the bearing support ring, disposed axially aft of the fluid port, and extending radially between the second annular body and the annular member of the frame.

19. The gas turbine engine of claim 17, wherein the gas turbine engine further comprises:
a bearing inner race disposed radially inward of the bearing outer race; and
a plurality of roller bearing elements disposed radially inward of the bearing outer race.

20. The gas turbine engine of claim 19 further comprising:
a ball bearing assembly disposed radially inward of the case and positioned axially forward of the second annular body of the bearing support ring.

* * * * *